United States Patent

[11] 3,582,577

[72] Inventor Morris Ribner
Chicago, Ill.
[21] Appl. No. 852,030
[22] Filed Aug. 21, 1969
[45] Patented June 1, 1971
[73] Assignee International Telephone and Telegraph Corporation
New York, N.Y.

[54] TONE FAILURE DETECTORS
5 Claims, 1 Drawing Fig.

[52] U.S. Cl. .......... 179/175.2
[51] Int. Cl. .......... H04n 3/22
[50] Field of Search .......... 179/175.2, 175.2 C, 175, 175.2 B, 1 MN, 84 VF; 324/78, 79, 118, 119

*Primary Examiner*—Kathleen H. Claffy
*Assistant Examiner*—Douglas W. Olms
*Attorneys*—C. Cornell Remsen, Jr., Walter J. Baum, Percy P. Lantxy, J. Warren Whitesel, Delbert P. Warner and James B. Raden

ABSTRACT: Tone failure detectors are provided for telephone equipment and are activated if any characteristic feature of a number of tones is lost. For example, alarm signals will be provided if either tone of a pair of tones disappears, if interruptions of tones are lost from tones for which interruptions are required, or if ringing tones are e lost.

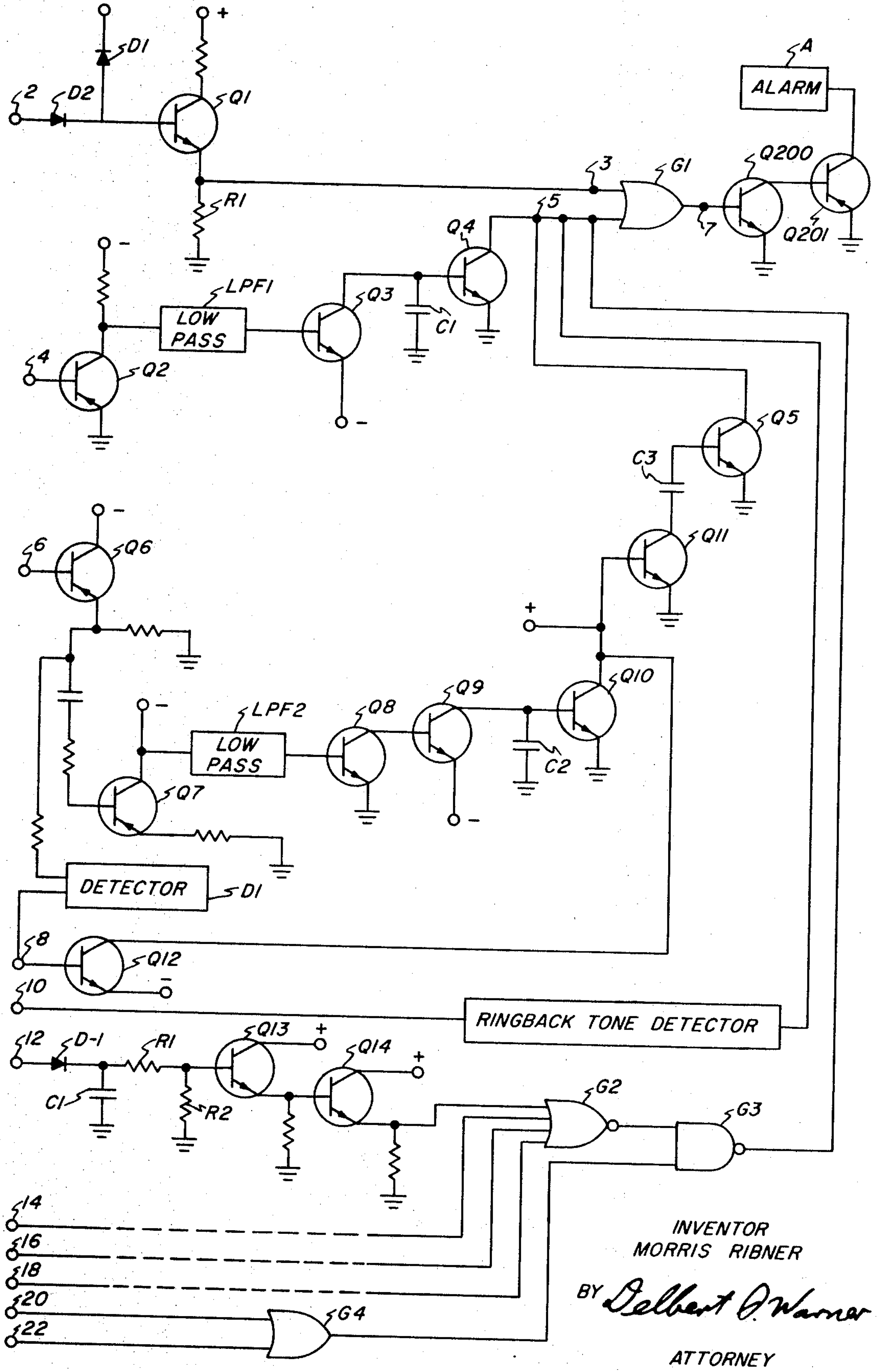
INVENTOR
MORRIS RIBNER
BY Delbert J. Warner
ATTORNEY

TONE FAILURE DETECTORS

The present invention relates to means for monitoring tones or pairs of tones to determine whether they are or are not continuously present, and also to determine whether interruptions which may be required are also present. The invention has particular application to telephone switching systems employing both single tones and multifrequency tones.

In modern telecommunication switching systems, it is commonplace to provide multifrequency signals for signalling. Frequently, the multifrequency signals consist of two distinct audio tones. It is commonplace also to use interrupted single tones, such as ringing tones. It is possible in such switching systems that one of two tones will disappear, a sole single tone will be lost, or that required interruptions may be lost. Loss of any of these signals, or interruptions, may lead to signalling errors.

It is an object of the present invention to provide means for determining whether any such losses of signals or interruptions have occurred. It is a further object to provide signals indicating when such losses have occurred. It is yet another object to operate alarm devices in the event of a failure.

The foregoing objects, and others ancillary thereto, I prefer to accomplish by use of a plurality of logic circuits feeding into a common alarm device. Each logic circuit receives one tone or a pair of tones and subjects it, or them, to analysis. Each circuit then provides a first output signal (logic 1) so long as it receives the prescribed input signal and a second output signal in the event of failure in the input signal. The first and second output signals are used to control a gate circuit. The gate circuit in turn provides a logic "zero" output if all its input signals are of the first kind and a logic "one" if any input is of the second kind. The logic "one" can be used to operate an alarm signal to indicate a failure in the system. However, signals of alternating short periods of logic 1 and 0 fail to produce an alarm.

The above mentioned and other features and objects of this invention, and the manner of obtaining them will become more apparent, and the invention itself will be better understood by reference to the following description of an embodiment of the invention. This will be visible in conjunction with the accompanying drawings, in which, the schematic diagram illustrates a preferred embodiment of the invention.

Turning to the figure, it will be noted that there are a plurality of terminals labeled 2, 4, 6...22 to which may be applied various signals to be monitored. It is a function of this invention to monitor the signals and detect when any one is missing. The signal applied at terminal 2 may be referred to as the Clock and Ring-tone Signal. This signal, characteristically, will be of a single frequency and, in a particular embodiment, has been selected to be 620 Herz. The illustrated detector consists of a rectifier, including diodes D1 and D2, which effectively cause saturation of transistor Q1 when the single-frequency 620 Herz tone is present on terminal 2. With Q1 saturated, a positive voltage is obtained at its emitter across resistor R1. This positive voltage is applied to one input of a dual input OR gate, G1. The OR gate, G1, is designed so that when a positive input is present on both input terminals, the output will be at ground potential. With the output of G1 at ground potential, transistors Q200 and Q201 will both remain OFF and the alarm, indicated by the block A, will not be operated. If either the tone on terminal 2 fails, or there is a failure of the input to terminal 5 of G1, G1 will provide a positive output at its terminal 7, causing Q201 and Q200 to become saturated and trigger the alarm, represented by Block A, thus providing an alarm signal.

A dial tone failure detector is described, beginning with terminal 4. Dial tone will consist typically of two tones which, in a preferred embodiment, have been selected as 440 and 480 Herz. If the tones are present on terminal 4, the transistor Q2 will be caused to operate in the Class B mode and provide a rectified signal to the low pass filter LPF1. The low pass filter is designed to pass only the difference frequency between the two tones, i.e., 40 Herz in this example. The transistor Q3 amplifies the 40 Herz signal, causing the capacitor C1 on the input of transistor Q4 to be charged to some negative potential such that Q4 remains OFF. If either of the tones appearing at Terminal 4 fails, the filter at the output of Q2 will not produce a signal and will cause transistor Q3 to be turned OFF. With Q3 turned OFF, transistor Q4 will switch ON, to place a ground on terminal 5 of Gate G1 to cause G1 to provide a positive output at terminal 7, which will activate the alarm A.

The busy tone also consists of two tones. These have been selected at 480 Herz and 620 Herz. The busy tone is applied through terminal 6 to a circuit for determining whether two tones are present, in a manner similar to that used in checking dial tone. However, since the busy tone is also interrupted at a rate of about one interruption per second, means for detecting the existence of this characteristic is also incorporated. The existence of this characteristic is also incorporated. The existence of the dual tone, therefore, rather than being used in controlling the alarm input transistor Q5 directly, enables a Gate (i.e. it cuts off Q10) which allows the passage of low frequency signals representing the envelope of the interrupted signals arriving from Q12. When two tones and interruptions both exist the interruptions are enabled to be applied on an alarm input transistor, Q5, which inhibits the alarm.

Circuit operation of the busy tone failure detector includes the application of interrupted mixed dual tones to the transistor Q6 and through Q6 to transistor Q7. The transistor Q7 is operated in the Class B mode to provide a rectified signal to a two-stage, low-pass filter, indicated as LPF2. The output of the filter is applied to the transistor, Q8. The output of transistor Q7 consists of voltage swings between about −18 volts and ground causing alternate conduction and nonconduction of Q8. This is applied to the capacitor C2 to charge it to a negative potential such that the transistor Q10 will be held OFF for as long as the dual tone persists and will thus enable the operation of the transistor Q11 in response to signals from Q12.

The busy signal is applied also from Q6 through a detector circuit indicated by block D1 to a transistor Q12. The circuit D1 is selected to transmit low frequency signals which represent the envelope of the interrupted signals. Transistor Q12 is alternately turned On and OFF for so long as the envelope is present at 8 thereby keeping Q11 in a similar state and, via the Capacitor C3, maintaining Q5 in alternating operation.

If one of the tones present on terminal 6 should cease to exist, transistor Q10 would switch ON, thereby disabling Q11 and preventing the envelope signals from reaching Q5. On the other hand, if the interruptions detected by transistor Q12 ceased to occur, no envelope signal would be applied to transistor Q5 through Capacitor C3. In either case, Transistor Q5 would be put in the permanently conductive state, thereby causing G1 to have a positive output and to operate the alarm device A.

A Ring Back Tone Detector is also supplied in practical embodiments of this invention. A circuit providing such a detector corresponds to that shown for busy tone. The chief difference between the circuits is in the filter, since the difference frequencies are not the same. In the interest of simplicity and conciseness the Ring Back Tone Detector is illustrated by a block diagram coupled between input terminal 10 and gate G1.

A 30 Herz tone detector is indicated as being coupled to terminals 12, 14, 16 and 18. This 30 Herz tone is sensed directly at the Tone Supply side of each of the user bay buses; in this example, four buses. These detectors are identical to each other, and, consequently, only one is shown in detail. Each of them includes a voltage divider R1–R2, a rectifier-integrator D1–C1 and an amplifier, formed by Q13–Q14. Each of the outputs from these circuits is fed to one input of a 4-input NOR gate, G2. If any one of the inputs to G2 should disappear for a period of time substantially longer than a four second ring cycle, its corresponding input to G2 will be lost. This will cause the output of NOR gate G2 to rise and begin an alarm timing cycle through NAND gate G3, gate G1, Q200, Q201 and the Alarm, A.

In the event that fewer than four bays are used, the input corresponding to the unused bay is neutralized by the application of +5 volts to the base of the appropriate one of the transistors represented by Q13. Since ring tones are not continuously supplied, in contrast to the other tones, it is necessary that the 30 Herz Ring Tone Detectors be disabled at times when no ring tone is required. This is done by a ground on the output of an OR gate G4 when there is no demand on either of the terminals 20 or 22 for a ringing signal.

While the principles of the invention have been described above in connection with specific apparatus and applications, it is to be understood that this description is made only by way of example and not as a limitation on the scope of the invention.

I claim:

1. A circuit for monitoring the continued existence of tones and pairs of tones in a switching system, comprising detector means for receiving and rectifying a first tone, transistor means for receiving the rectified signal and for applying it to a first terminal of a dual input OR gate, means for receiving and detecting pairs of tones to provide rectified signals, means for processing said provided rectified signals to produce a control signal, and means sensitive to the presence of said control signal to provide a bias to a second terminal of the OR gate to hold the output of the gate to a ground level.

2. A circuit, as claimed in claim 1, in which the detector means includes a rectifier which achieves saturation of the transistor means in the presence of the first tone.

3. A circuit as claimed in claim 1, in which the means for receiving and detecting the loss of either of a pair of tones includes a transistor operable in the Class B mode.

4. A circuit as claimed in claim 1, in which the means for processing said rectified signals includes a band pass filter for eliminating undesired signals elements while passing desired signals, and a transistor responsive to the presence of desired signals for providing an inhibit signal to the OR gate.

5. A circuit as claimed in claim 1, in which means are provided for recognizing the disappearance of necessary tone interruptions, and means are provided for introducing a control signal to obtain an output signal from the OR gate in response to this disappearance.